United States Patent
Tiwari et al.

(10) Patent No.: US 12,058,638 B2
(45) Date of Patent: *Aug. 6, 2024

(54) PROCEDURE TO UPDATE THE PARAMETERS RELATED TO UNIFIED ACCESS CONTROL

(71) Applicant: NEC Corporation, Tokyo (JP)

(72) Inventors: Kundan Tiwari, Chennai (IN); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,624

(22) Filed: Nov. 4, 2022

(65) Prior Publication Data

US 2023/0051617 A1 Feb. 16, 2023

Related U.S. Application Data

(63) Continuation of application No. 16/857,723, filed on Apr. 24, 2020, now Pat. No. 11,496,981, which is a (Continued)

(30) Foreign Application Priority Data

Sep. 19, 2018 (IN) .............................. 201811035318

(51) Int. Cl.
*H04W 60/00* (2009.01)
*H04L 1/00* (2006.01)
(Continued)

(52) U.S. Cl.
CPC ........... *H04W 60/00* (2013.01); *H04L 1/0055* (2013.01); *H04W 4/12* (2013.01); *H04W 76/25* (2018.02)

(58) Field of Classification Search
None
See application file for complete search history.

(56) References Cited

U.S. PATENT DOCUMENTS 7,366,509 B2    4/2008   Akgun et al.
11,496,981 B2*   11/2022   Tiwari .................. H04L 1/0055
(Continued)

FOREIGN PATENT DOCUMENTS

CN    106572516 A    4/2017
CN    107580796 A    1/2018
(Continued)

OTHER PUBLICATIONS

Indian Office Action for IN Application No. 202017015179 mailed on Jul. 13, 2021.
(Continued)

*Primary Examiner* — Shripal K Khajuria
(74) *Attorney, Agent, or Firm* — NEC-IPC

(57) ABSTRACT

A method for core network node comprises sending, to a User Equipment (UE) (300), a REGISTRATION ACCEPT message containing at least one operator-defined access category definitions wherein the containing at least one operator-defined access category definitions causes the UE to send REGISTRATION COMPLETE message; receiving, from the UE (300), a REGISTRATION COMPLETE message indicating acknowledge reception of the at least one operator-defined access category definitions.

22 Claims, 4 Drawing Sheets

Related U.S. Application Data continuation of application No. PCT/JP2019/032899, filed on Aug. 22, 2019.

(51) Int. Cl.
*H04W 4/12* (2009.01)
*H04W 76/25* (2018.01)

(56) References Cited

U.S. PATENT DOCUMENTS

| | | | |
|---|---|---|---|
| 2018/0220302 A1 | 8/2018 | Chen et al. | |
| 2018/0227873 A1 | 8/2018 | Vrzic et al. | |
| 2018/0324060 A1* | 11/2018 | Chaponniere | H04L 67/141 |
| 2019/0174449 A1* | 6/2019 | Shan | H04W 60/04 |
| 2019/0342851 A1 | 11/2019 | Shan et al. | |
| 2021/0076444 A1* | 3/2021 | Shu | H04W 48/16 |

FOREIGN PATENT DOCUMENTS

| | | |
|---|---|---|
| CN | 108323245 A | 7/2018 |
| CN | 110366241 A | 10/2019 |
| JP | 2018-534867 A | 11/2018 |
| WO | WO-2018/026185 A1 | 2/2018 |
| WO | 2018/141255 A1 | 8/2018 |
| WO | 2018/145727 A1 | 8/2018 |

OTHER PUBLICATIONS

Japanese Decision to Grant a Patent issued in Japanese Patent Application No. 2020-518736, dated Dec. 15, 2020, 5 pages.
3GPP "3rd Generation Partnership Project; Technical Specification Group Core Network and Terminals; 5G System—Phase 1, CT WG1 Aspects (Release 15)", 3GPP TR 24.890 V15.1.0, (Mar. 2018), pp. 1-163.
Extended European Search Report issued in European Patent Application No. 19863504.7, dated Aug. 26, 2020, 8 pages.
International Search Report and Written Opinion issued in International Patent Application No. PCT/JP2019/032899, dated Nov. 12, 2019, 5 pages.
3GPP "3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15)," (Jun. 2018), pp. 1-337 (337 pages).
Chinese Office Action for CN Application No. 201980004926.9, mailed on Feb. 15, 2023 with English Translation.
Qualcomm Incorporated, "Signalling UE support for operator-defined access category criteria types", 3GPP TSG-CT WG1 Meeting #112, C1-185159, Aug. 13, 2018.
Vencore Labs et al., "Clarify the method of configuring the UE to use Access Identity 1", 3GPP TSG-CT WG1 Meeting #112 C1-185674, Aug. 20-24, 2018, pp. 1-11.
Ericsson et al., "Corrections for operator-defined access categories", 3GPP TSG-CT WG1 Meeting #111bis C1-184938, Jul. 9-13, 2018, pp. 1-16.
Ericsson, "5G UAC—editor's note in 4.5.X", 3GPP TSG-CT WG1 Meeting #111 C1-183805, May 21-25, 2018, p. 1-p. 3.
NEC, "UAC: Correction for operator-defined access categories of acknowledgement", 3GPP TSG-CT WG1 Meeting #112bis C1-186473, Oct. 15-19, 2018, p. 1-p. 13.
LG Electronics, "Storing Configured NSSAI when the PLMN is changed", 3GPP TSG-CT WG1 Meeting #111bis C1-184941, Jul. 9-13, 2018, p. 1-p. 4.
LG Electronics, "Updating NS Configuration via registration procedure", 3GPP TSG-CT WG1 Meeting #112 C1-185680, Aug. 20-24, 2018, p. 1-p. 17.
3GPP TS 24.501 V15.5.0 (Sep. 2019), Sep. 2019, p. 1-p. 479.
3GPP TS 24.501 V15.1.0 (Sep. 2018), Sep. 2018, p. 1-p. 398.
3GPP TS 24.501 V15.2.0 (Dec. 2018), Dec. 2018, p. 1-p. 455.
Qualcomm Incorporated, "Unified access control in 5GS", 3GPP TSG-CT WG1 Meeting #106 C1-174043, Oct. 23-27, 2017, p. 1-p. 4.
Intel Corporation et al, "Unified Access Control—Merging alternative 2 and alternative1", 3GPP TSG-CT WG1 Meeting #108 C1-180347, Jan. 22-26, 2018, p. 1-p. 11.
Ericsson et al, "Corrections for operator-defined access categories", 3GPP TSG-CT WG1 Meeting #111bis C1-184082, Jul. 9-13, 2018, p. 1-p. 11.
Ericsson et al., "Corrections for operator-defined access categories", 3GPP TSG-CT WG1 Meeting #111bis C1-184740, Jul. 9- 13, 2018, p. 1-p. 16.
Ericsson et al., "5G-unified access control-updates of alternative 3", 3GPP TSG-CT WG1 Meeting #107 C1-175191, Nov. 27-Dec. 1, 2017, p. 1-p. 10.
LG Electronics Inc., "Mandatoriness of access category in Unified Access Control", 3GPP TSG-SA WG1 Meeting #80 S1-174033, Nov. 27-Dec. 1, 2017, p. 1-p. 9.

* cited by examiner

PROCEDURE TO UPDATE THE PARAMETERS RELATED TO UNIFIED ACCESS CONTROL

CROSS-REFERENCE TO RELATED APPLICATIONS

The present application is a continuation application of Ser. No. 16/857,723 filed on Apr. 24, 2020, which is a continuation application of International Patent Application No. PCT/JP2019/032899 filed on Aug. 22, 2019, which claims priority to Indian Application No. 201811035318 filed on Sep. 19, 2018, the disclosures of each of which are hereby incorporated by reference in their entity.

TECHNICAL FIELD

The present disclosure relates to the procedure to update the parameters related to Unified Access Control.

BACKGROUND ART

In 5GS Unified Access Control (UAC) is defined to perform the access control of the signalling from the UEs in various situation (e.g. congestion, network maintenance etc.). The UE is configured with access identity and the event that is categorized as access category. The access category is further categorized with as a standard access category and an operator defined access category. Hereinafter, the operator defined access category is also denoted as "PLMN operator defined access category". The PLMN operator defined access category is sent to the UE in a NAS message. The current operator defined access categories are 1) DNN, 2) 5G QoS ID, 3) OS ID+APP ID and 4) S-NSSAI. The operator defined access categories are per PLMN basis.

When the UE is required to access a network, the NAS layer of the UE determines an access type and the access category of the event. The NAS layer of the UE gives this parameter to the Access Stratum (e.g. RRC layer, SDAP layer, PDCP layer, RLC layer, MAC layer and PHY layer) of the UE for access control procedure. The access layer based on the access category and access type determines whether the access to the network is allowed or not. If the access to the network is allowed then the UE establishes the RRC connection and then sends initial NAS message. If the access to the network is not allowed for the event then the Access Stratum (AS) layer informs the NAS layer that access is not allowed for the event. In this case, the NAS layer neither establishes the NAS signalling connection nor sends the NAS message till the access to the network becomes allowed.

CITATION LIST

Non Patent Literature

NPL 1: 3GPP TS 24.501 V15.0.0 (2018-6)

SUMMARY OF INVENTION

Technical Problem

Problem Statement 1:
The network transmits the Operator Defined Access Category Definition (ODACD) to the UE in a NAS message. However, sending the ODACD in Configuration Update Command message as defined in NPL 1 is not efficient as the network needs to send ODACD in the Configuration Update Command message after the registration procedure is successfully completed. This will delay the configuration of the ODACD in the UE and hence the access control mechanism is not applied by the UE until the Configuration Update Command message arrives to the UE after the registration procedure complete. In addition, the 5GS has the feature so called follow-on request. In the follow-on request case, the UE includes an active flag information element in the registration request message in order to establish the PDU session(s) right after the completion of the registration procedure. In this case, the UAC for limiting MO call under the Operator Defined Access Category does not function at all.

In these scenarios if the network is experiencing congestion and wants to stop signalling from the UE then the network cannot stop signalling. The congestion situation may be worsened. This requires an extra signalling to convey ODACD.

Moreover, when the network configures a UE with ODACD then the acknowledgement of successful reception of the ODACD is required at the network as the NAS message containing ODACD may not be received by the UE when the NAS message is lost (e.g. due to radio link failure between the UE and the NG-RAN before the NAS message is transferred to the UE).

Problem Statement 2:
The network may not configure UEs with ODACD due to some network condition (e.g. Congestion). In such situation the network may not keep track which UEs are configured with ODACD and which UEs are not configured with ODACD. The network may not be able to configure the UE with ODACD. Such UE does not have the ODACD configured and will not apply the ODACD in the PLMN.

Also in some situations, network may not be able to know what the current ODACD of the UE is. In this scenario when the network needs to update the UE with ODACD, the network does not know which UEs needs to be updated. This may lead network to update all the UEs with current ODACD even though the UE is already have latest ODACD configured. This will incur extra signalling.

Solution to Problem

A method for core network node according to a first aspect of the present disclosure includes sending, to a User Equipment (UE), a REGISTRATION ACCEPT message containing at least one operator-defined access category definitions wherein the containing at least one operator-defined access category definitions causes the UE to send REGISTRATION COMPLETE message; receiving, from the UE, a REGISTRATION COMPLETE message indicating acknowledge reception of the at least one operator-defined access category definitions.

A core network node according to a second aspect of the present disclosure includes a memory storing instructions; and at least one hardware processor configured to process the instruction to: send, to a User Equipment (UE), a REGISTRATION ACCEPT message containing at least one operator-defined access category definitions wherein the containing at least one operator-defined access category definitions causes the UE to send REGISTRATION COMPLETE message; receive, from the UE, a REGISTRATION COMPLETE message indicating acknowledge reception of the at least one operator-defined access category definitions.

An User Equipment (UE) according to a third aspect of the present disclosure includes a memory storing instructions; and at least one hardware processor configured to process the instruction to: receive, from a core network node, a REGISTRATION ACCEPT message including at least one operator-defined access category definition; store the received at least one operator-defined access category definition; and send, to the core network node, a REGISTRATION COMPLETE message indicating acknowledge of the received at least one operator-defined access category definition.

DESCRIPTION OF EMBODIMENTS

Abbreviations

Figure 1:
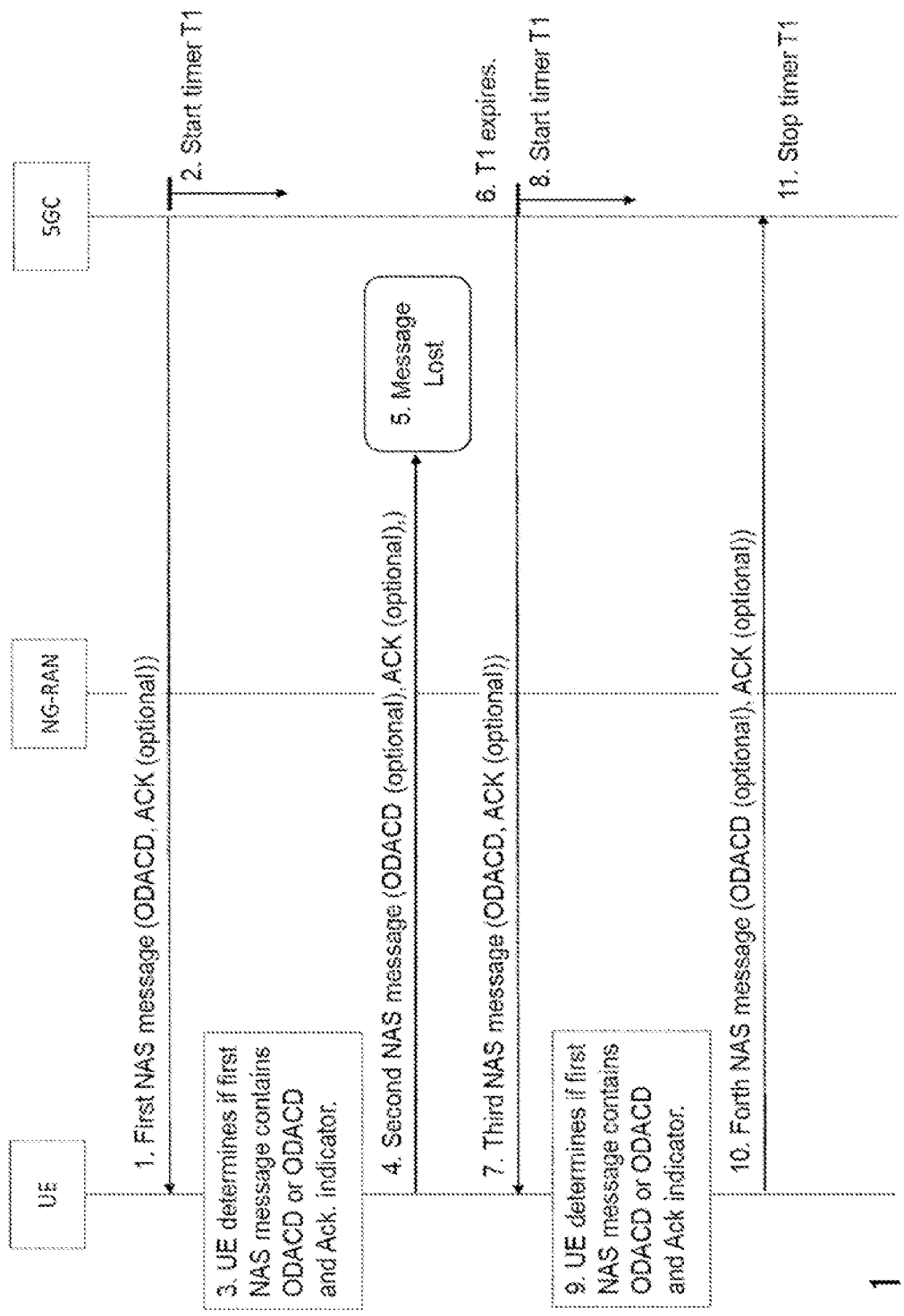
FIG. 1 illustrates signalling flow of solution 1.

For the purposes of the present document, the abbreviations given in 3GPP TR 21.905 V15.0.0 (2018-03) and the following apply. An abbreviation defined in the present document takes precedence over the definition of the same abbreviation, if any, in 3GPP TR 21.905 V15.0.0 (2018-03).

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function
MT Mobile Terminated
UAC Unified Access Control
ODACD Operator Defined Access Category Definitions
OS Operating System Definitions For the purposes of the present document, the terms and definitions given in 3GPP TR 21.905 V15.0.0 (2018 March) and the following apply. A term defined in the present document takes precedence over the definition of the same term, if any, in 3GPP TR 21.905 V15.0.0 (2018 March).

First Aspect (Solution 1 to Solve Problem Statement 1):
Transmitting a NAS message acknowledging the reception of ODACD in a NAS message.
Some instances of the first aspect of solution 1 are given below.

1. A network sends ODACD in a NAS message and starts a timer to a UE. In one case the network includes an indication requesting the UE to transmit the acknowledgement of the reception of ODACD.

2. The UE on receiving the NAS message containing ODACD only or both of ODACD and an indication requesting the UE to send acknowledgement of reception of ODACD, removes previously received ODACD, stores the newly received ODACD in the first NAS message and transmits a NAS message containing an indicator indicating successful reception of the ODACD to the network. The UE applies the received ODACD parameters in the Unified Access Control.

3. When the timer started in step 1 expires, the network retransmits another NAS message with content as defined in step 1.

Another instance of the first aspect of solution 1 are described below and FIG. 1.

1-2. A network transmits a first Non Access Stratum (NAS) message containing an Operator-Defined Access Category Definitions (ODACD) information element to a UE. The network starts a timer T1 after transmitting the first NAS message.

In one example the first NAS message contains ODACD and an Ack information element requesting the UE to send a Second NAS message as an acknowledgement of the reception of ODACD. The network starts the timer T1 only when the ACK information and ODACD are included in the first NAS message i.e. if it does not include ODACD and the ACK information element, then the network does not start the timer T1.

3. The UE receives the first NAS message. The UE removes the previously received ODACD and stores the newly received ODACD in the first NAS message as the latest ODACD.

4. The UE determines if the first NAS message contains ODACD information element. If the first NAS message contains the ODACD information element, the UE transmits the second NAS message containing current ODACD or current ODACD and ACK information element indicating successful reception of the ODACD in the first NAS message or just a NAS message.

In one example if the first NAS message contains ODACD and ACK information element then the UE transmits the second NAS message containing current ODACD or current ODACD and ACK information element indicating successful reception of the ODACD in the first NAS message or just a NAS message.

5. The second NAS message is lost.

6-8. The timer T1 expires and the network retransmits third NAS message. The third NAS message contains latest ODACD of the UE. The network follows the procedure as described in step 1. In one example the timer expiration in step 6 may occur in a situation where the first NAS message in step1 is lost.

9-10. Upon receiving the third NAS message the UE executes procedure as described in step 3 and step 4.

11. Upon receiving the forth NAS message containing an information element indicating the successful reception of the ODACD, the network stops the time T1. In one example the network stops the timer T1 when it receives ODACD or ODACD and an information element indicating successful reception of the ODACD. In one example the network will stop the timer T1 when it receives a forth NAS message indicating the successful reception of ODACD i.e. the forth NAS message does not include any acknowledgement of reception of ODACD or ODACD itself.

In one example the first NAS message and the third NAS message is Registration Accept message as defined in TS 24.501[4] and the second NAS message and forth NAS message is Registration complete message as defined in TS 24.501[4].

The timer T1 unit may be millisecond, second, minutes or hour.

In one example the first NAS message or the third NAS message is DL NAS TRANSPORT as defined in TS 24.501 [4] and the second NAS message or the forth NAS message is UL NAS TRANSPORT as defined in TS 24.501[4]. The timer T1 is a new timer.

In one example the first NAS message or the third NAS message is a new NAS message or an existing NAS message other than Configuration Update Command and the second NAS message or the forth NAS message is an another new message or an existing NAS message other than Configuration Update Complete message. The timer T1 is a new timer.

In one example the network or 5GC in the solution 1 is the AMF.

In one example the network in the solution 1 is the MME.

In one example of the solution 1, the ACK information element is always set together with the ODACD information element. However, the network can indicate the ACK information element to UE standalone in the first NAS message and third NAS message whenever the network requires a acknowledge message from the UE to make sure that all information in the first NAS message or third NAS message are properly received by the UE. If the UE receives the ACK information element in the first NAS message and third NAS message and UE has properly received the first NAS message or third NAS message, then the UE sends the second NAS message or forth NAS message to the network. The second NAS message and forth NAS message may include the ACK information element and an information element that is requested by the network in the first NAS message or third NAS message. This mechanism can be considered as a general mechanism to synchronize data setting between the UE and Network.

In one example the network does not include ACK information element. When the UE receives the ODACD information element in a NAS message then the UE always transmits a NAS message indicating acknowledgement of the reception of ODACD.

In one example the UE transmits the second NAS message or the forth NAS message without containing any information element explicitly indicating the reception of the ODACD. Upon reception of the second NAS message or the forth NAS message at the network, the network determines that the ODACD is received successfully at the UE.

Alternatively or in addition the above, UE may determine whether the transmission of the NAS message including the acknowledgement of the reception of ODACD is needed or not based on combination of a specific NAS massage and the ODACD IE. The specific NAS massage may be the Registration Accept message, the DL NAS TRANSPORT message or the existing NAS message other than Configuration Update Command. In one example, 3GPP technical standards may define that the UE shall transmit the NAS message including the acknowledgement of the reception of ODACD if the received specific NAS massage includes the ODACD IE and if the specific NAS massage is Registration Accept message. In this situation, if the UE have received the Registration Accept message including the ODACD IE, then the UE determines that the transmission of the NAS message including the acknowledgement of the reception of ODACD is needed.

Second Aspect (Solution 2 Solves Problem Statement 2):

A UE indicating the current ODACD configuration to the network.

Figure 2:
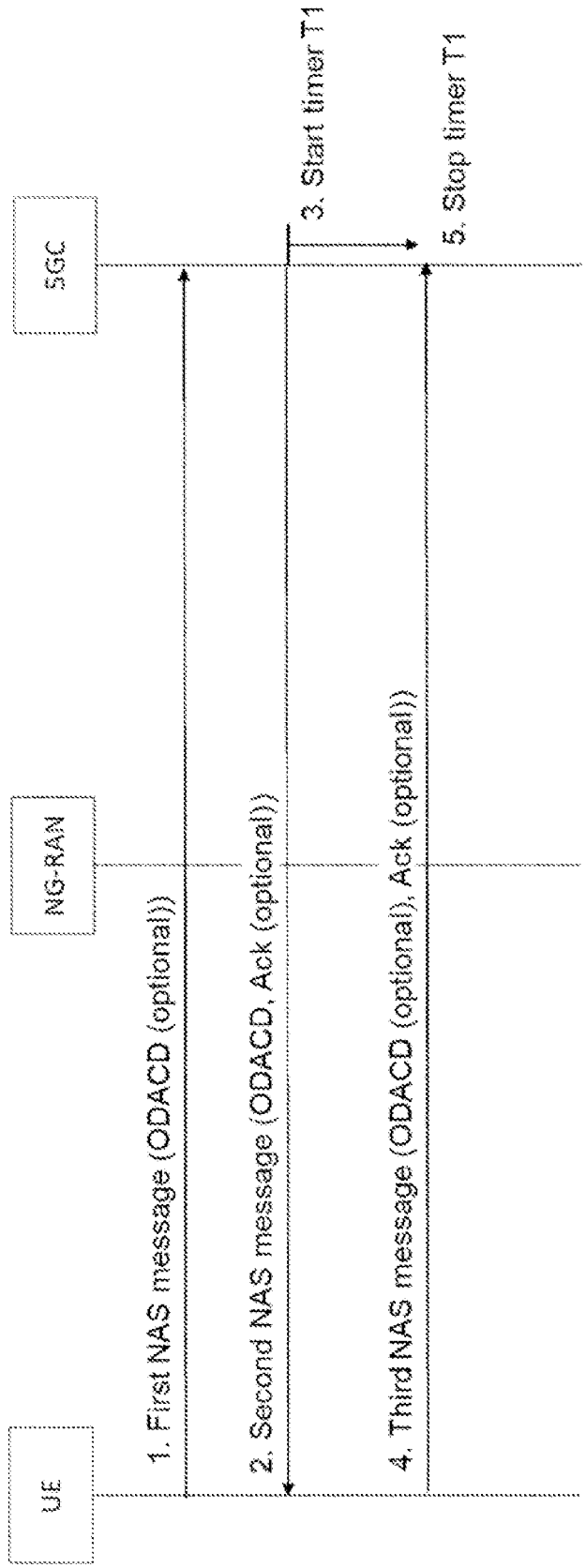
FIG. 2 illustrates signalling flow of solution 2.

Some instances of the second aspect of solution 2 are given below. FIG. 2 shows steps of solution 2.

1. When a UE transmits a NAS message to the network, the UE includes a current ODACD to a network. In one case, the UE transmits ODACD IE in the NAS message when the UE has not been configured with any ODACD.

2. When the network receives the ODACD in a NAS message then the network compares the received ODACD with the current ODACD of the UE. In case the received ODACD from the UE is different from the current ODACD in the network then the network transmits ODACD in a NAS message.

3. When a UE receives the ODACD in the NAS message then the UE removes any previously configured ODACD, stores the received ODACD and uses the ODACD in the UAC procedure.

Another instance of the second aspect of solution 2 is described below.

1. A UE sends a first NAS message containing current ODACD configured in the UE. In one example if the UE has not been configured with ODACD then the ODACD IE indicates that the ODACD is not configured in the UE. Here, the ODACD IE may explicitly indicates that the ODACD is not configured in the UE. Alternatively, the ODACD IE may implicitly indicates that the ODACD is not configured in the UE by emptying a content of the ODACD IE.

In one example when the UE is not configured with ODACD then the UE starts a timer T1 and executes step 1 when the timer T1 expires.

2-3. Upon receiving the first NAS message in the network, the network determines if the received ODACD is the latest ODACD configured for the UE or the ODACD indicates that the UE is not configured with any ODACD. If the received ODACD is not the latest or the ODACD indicates that the UE is not configured with the ODACD then the network transmits a second NAS message containing the latest ODACD to the UE. The network starts a timer T1.

In one scenario the network includes an indicator requesting the UE to send a NAS message indicating reception of the NAS message containing ODACD.

4. Upon receiving the second NAS message the UE transmits the third NAS message containing an information element indicating the successful reception of the ODACD.

In one example the UE includes the ODACD received from the network in the third NAS message.

In one example the UE transmits the third NAS message when the second NAS message includes ODACD and the information element Ack requesting the UE to transmit a NAS message on reception of ODACD.

5. The network on reception of the third NAS message stops timer T1.

In one example the first NAS message is Registration Request message, Service Request message, UL NAS TRANSPORT message or an existing NAS message or a new NAS message. The second NAS message is Registration Accept message, DL NAS TRANSPORT as defined in TS 24.501, Configuration Update Command, any other existing NAS message or a new NAS message. The third NAS message is UL NAS TRANSPORT, Configuration Update Complete, an existing NAS message as defined in TS 24.501 or a new NAS message. The timer T1 is a new timer.

The timer T1 unit may be millisecond, second, minute or hour.

In one example, the network includes an information element requesting the UE to send acknowledgement of reception of the ODACD in the second NAS message. The UE on receiving the information element transmits the second NAS message containing an information element indicating that the UE received the ODACD. In another example the UE includes in the third NAS message the ODACD Information Element as received in the Second NAS message. In one example the UE transmits the second NAS message or the forth NAS message without containing any information element explicitly indicating the reception of the ODACD. Upon reception of the third NAS message at the network, the network determines that the ODACD is received successfully at the UE.

In one example the UE and the network will follow the steps 3-11 as captured in solution 1 of this document.

In one example the network or 5GC in the solution 2 is the AMF.

In one example the network in the solution 2 is the MME.

Another Aspect

The previously mentioned ODACD may include following parameters:
 a) a precedence value which indicates in which order the UE shall evaluate the operator-defined category definition for a match;
 b) an operator-defined access category number, i.e. access category number in the 32-63 range that uniquely identifies the access category in the PLMN in which the access categories are being sent to the UE; and
 c) one or more access category criteria type and associated access category criteria type values. The access category criteria type can be set to one of the following:
  1) DNN name;
  2) 5QI;
  3) OS Id+OS App Id of application triggering the access attempt; or
  4) S-NSSAI; and
 d) optionally, a standardized access category, that is used in combination with the access identities to determine the establishment cause.

Here, each operator-defined access category definition may have a different precedence value. Several operator-defined access category definitions can have the same operator-defined access category number.

In one example, upon receiving a NAS signalling message with one or more operator-defined access category definitions, the UE shall store the operator-defined access category definitions for the registered PLMN.

In one example, upon receiving a NAS signalling message with zero operator-defined access category definitions, the UE shall delete the operator-defined access category definitions stored for the registered PLMN.

In one example, when the UE is switched off, the UE shall keep the operator-defined access category definitions so that the operator-defined access category definitions can be used after switch on.

In one example, when the UE selects a new PLMN which is not equivalent to the previously selected PLMN, the UE shall stop using the operator-defined access category definitions configured for the previously selected PLMN and should keep the operator-defined access category definitions configured for the previously selected PLMN.

Another aspect Any NAS messages mentioned above may be transmitted between the UE and AMF via a NGRAN node (i.e. gNB).

Furthermore, a part of sequences, procedures or messages mentioned above may be not always needed for identifying one or more inventions.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 1 (source: 3GPP TS 22.368 V14.0.1 (2017 August), Annex B, the contents of which are incorporated herein by reference). This list is not exhaustive and is intended to be indicative of some examples of machine-type communication applications.

TABLE 1

Some examples of machine-type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |

TABLE 1-continued

Some examples of machine-type communication applications.

| Service Area | MTC applications |
| --- | --- |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote | Sensors |
| Maintenance/Control | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

Figure 3:
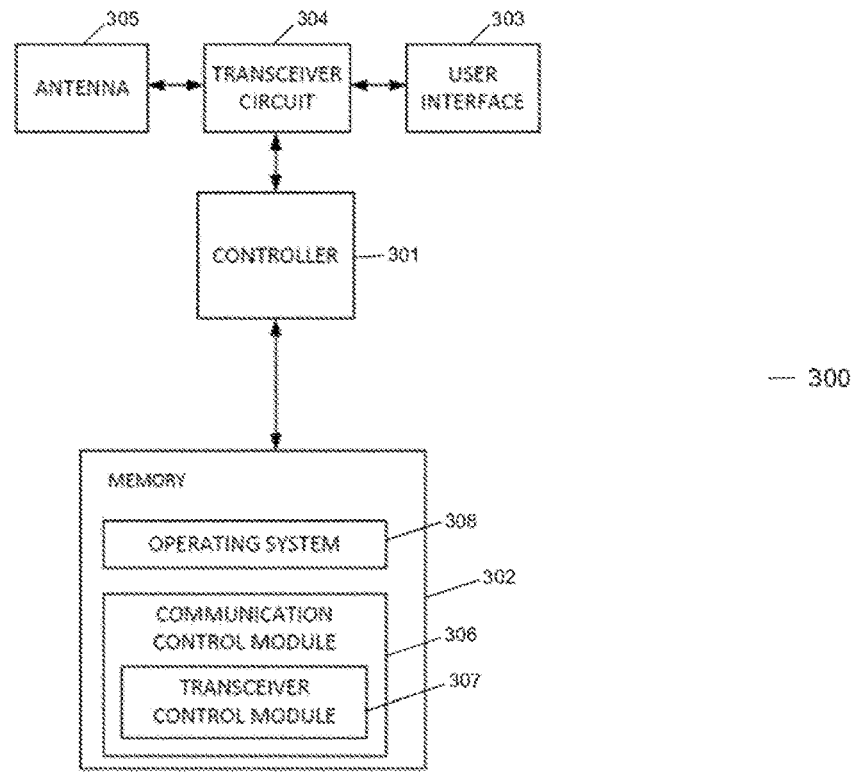
FIG. 3 illustrates general block diagram for UE.

FIG. 3 is a block diagram illustrating the main components of the UE (300). As shown, the UE includes a transceiver circuit (304) which is operable to transmit signals to and to receive signals from the connected node(s) via one or more antenna (305). Although not necessarily shown in FIG. 3, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller (301) controls the operation of the UE in accordance with software stored in a memory (302). For example, the controller may be realized by Central Processing Unit (CPU). The software includes, among other things, an operating system and a communication control module (306) having at least a transceiver control module (307). The communication control module (306) (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages,), NAS messages such as periodic location update related messages (e.g. tracking area update, paging area updates, location area update) etc.

Figure 4:
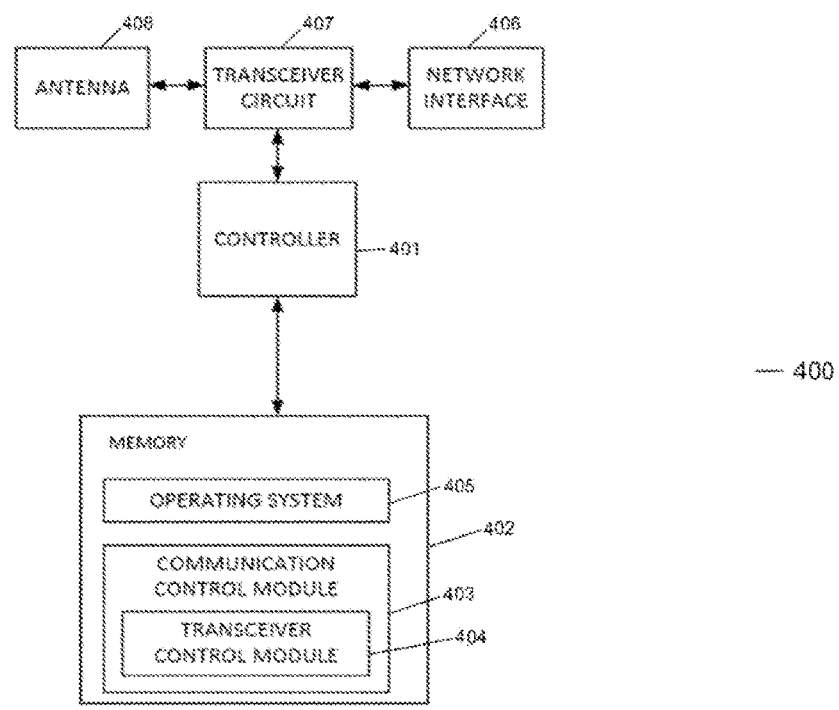
FIG. 4 illustrates general block diagram for (R)AN.

FIG. 4 is a block diagram illustrating the main components of an exemplary (R)AN node (400), for example a base station ('eNB' in LTE, 'gNB' in 5G). As shown, the (R)AN node (400) includes a transceiver circuit (407) which is operable to transmit signals to and to receive signals from connected UE(s) via one or more antenna (408) and to transmit signals to and to receive signals from other network nodes (either directly or indirectly) via a network interface (406). A controller (401) controls the operation of the (R)AN node in accordance with software stored in a memory (402). For example, the controller may be realized by Central Processing Unit (CPU). Software may be pre-installed in the memory and/or may be downloaded via the telecommunication network or from a removable data storage device (RMD), for example. The software includes, among other things, an operating system and a communication control module having at least a transceiver control module (404).

The communication control module (403) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 5:
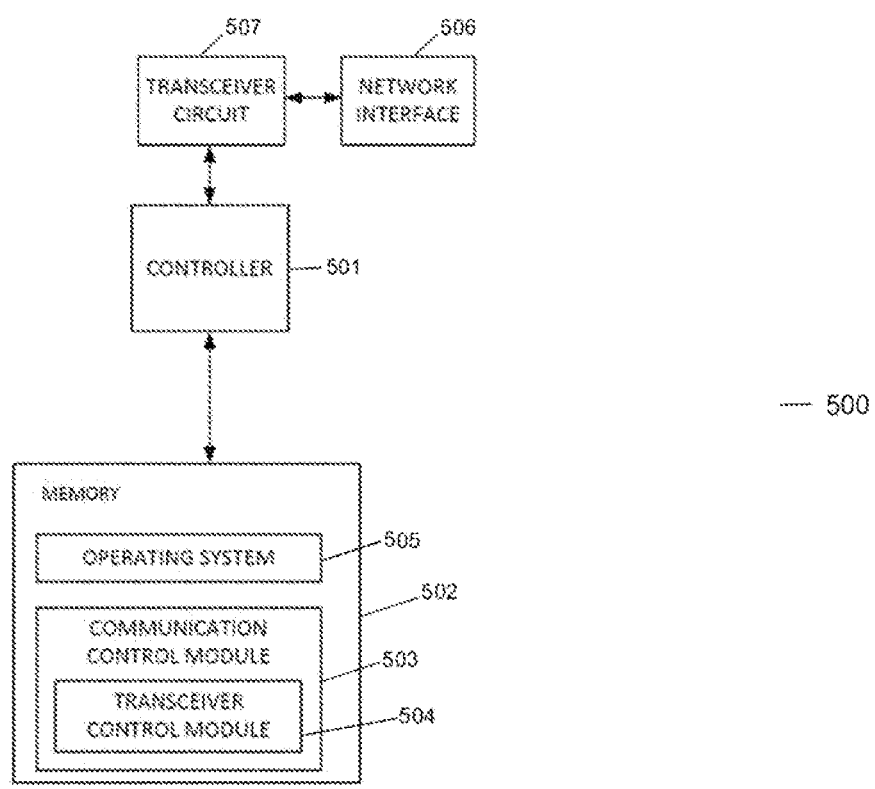
FIG. 5 illustrates general block diagram for AMF.

FIG. 5 is a block diagram illustrating the main components of the AMF (500). The AMF (500) is included in the 5GC. As shown, the AMF (500) includes a transceiver circuit (507) which is operable to transmit signals to and to receive signals from other nodes (including the UE) via a network interface (506). A controller (501) controls the operation of the AMF (500) in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communication control module (503) having at least a transceiver control module (504).

The communication control module (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian patent applications No. 201811035318, filed on Sep. 19, 2018, the disclosure of which is incorporated herein in its entirety by reference.

REFERENCE SIGNS LIST

300 UE
301 controller
302 memory
303 user interface
304 transceiver circuit
305 antenna
306 communication control module
307 transceiver control module
308 operating system
400 (R)AN node
401 controller
402 memory
403 communication control module
404 transceiver control module
405 operating system
406 network interface
407 transceiver circuit
408 antenna
500 AMF
501 controller
502 memory
503 communication control module
504 transceiver control module
505 operating system
506 network interface
507 transceiver circuit

The invention claimed is:

1. A method for core network node, the method comprising:
    sending, to a User Equipment (UE), a REGISTRATION ACCEPT message containing at least one first operator-defined access category definition to cause the UE to send a REGISTRATION COMPLETE message indicating acknowledgement of reception of the at least one operator-defined access category definition; and
    receiving, from the UE, the REGISTRATION COMPLETE message, wherein the first operator-defined access category definition is a part of a group of the operator-defined access category definition, wherein the group of the operator-defined access category definition comprises at least one of DNN, OS id+OS App id, and S-NSSAI.

2. The method according to claim 1 comprising: starting a timer in a case where the at least one operator-defined access category definition is included in the REGISTRATION ACCEPT message.

3. The method according to claim 2 comprising: stopping the timer upon receiving the REGISTRATION COMPLETE message.

4. The method according to claim 2, further comprising:
    resending the REGISTRATION ACCEPT message if the core network node does not receive the REGISTRATION COMPLETE message before the timer expires.

5. A method for a User Equipment (UE) the method comprising:
    receiving, from a core network node, a REGISTRATION ACCEPT message including at least one first operator-defined access category definition;
    storing the at least one first operator-defined access category definition; and
    sending, to the core network node, a REGISTRATION COMPLETE message indicating acknowledgement of the at least one first operator-defined access category definition in a case where the REGISTRATION ACCEPT MESSAGE includes the at least one first operator-defined access category definition, wherein the first operator-defined access category definition is a part of a group of the operator-defined access category definition, wherein the group of the operator-defined access category definition comprises at least one of DNN, OS id +OS App id, and S-NSSAI.

6. The method according to claim 5, further comprising:
    deleting a second operator-defined access category definition stored before the storing the at least one first operator-defined access category definition in a case where the UE stored operator-defined access category definition.

7. The method according to claim 6, further comprising:
receiving, from the core network, a second REGISTRATION ACCEPT message including at least one operator-defined access category definition in a case where the core network node did not receive the REGISTRATION COMPLETE message before a timer expires wherein the timer starts counting when the core network node sends the REGISTRATION ACCEPT message.

8. The method according to claim 5, further comprising:
sending, to the core network node, a first REGISTRATION REQUEST message;
starting a timer based on the sending the REGISTRATION REQUEST message; and
sending, to the core network node, a second REGISTRATION REQUEST message based on expiry of the timer.

9. The method according to claim 8, wherein
the REGISTRATION REQUEST message indicating that the UE is not configured with operator-defined access category definition.

10. A core network node comprising:
a memory having stored therein program instructions; and
at least one processor that when executing the program instructions is configured to:
send, to a User Equipment (UE), a REGISTRATION ACCEPT message containing at least one operator-defined access category definition to cause the UE to send a REGISTRATION COMPLETE message indicating acknowledgement of reception of the at least one operator-defined access category definition; and
receive, from the UE, the REGISTRATION COMPLETE message, wherein the first operator-defined access category definition is a part of a group of the operator-defined access category definition, wherein the group of the operator-defined access category definition comprises at least one of DNN, OS id+OS App id, and S-NSSAI.

11. The core network node according to claim 10, wherein the processor configured to start a timer in a case where the at least one operator-defined access category definition is included in the REGISTRATION ACCEPT message.

12. The core network node according to claim 11, wherein the processor configured to stop the timer upon receiving a REGISTRATION COMPLETE message.

13. The core network node according to claim 11, wherein the processor configured to resend the REGISTRATION ACCEPT message if the core network node does not receive the REGISTRATION COMPLETE message before the timer expires.

14. A User Equipment (UE) comprising:
a memory having stored therein program instructions; and
at least one processor that when executing the program instruction is configured to:
receive, from a core network node, a REGISTRATION ACCEPT message including at least one first operator-defined access category definition;
store the at least one first operator-defined access category definition; and
send, to the core network node, a REGISTRATION COMPLETE message indicating acknowledgement of the at least one first operator-defined access category definition in a case where the REGISTRATION ACCEPT MESSAGE includes the at least one first operator-defined access category definition, wherein the first operator-defined access category definition is a part of a group of the operator-defined access category definition, wherein the group of the operator-defined access category definition comprises at least one of DNN, OS id +OS App id, and S-NSSAI.

15. The UE according to claim 14, wherein the processor configured to delete a second stored operator-defined access category definition before the UE stores the at least one first operator-defined access category definition in a case where the UE stored operator-defined access category definition.

16. The UE according to claim 15, wherein the processor configured to receive, from the core network, a second REGISTRATION ACCEPT message including at least one operator-defined access category definition in a case where the core network node did not receive the REGISTRATION COMPLETE message before a timer expires, wherein the timer starts counting when the core network node sends the REGISTRATION ACCEPT message.

17. The UE according to claim 14, wherein the processor configured to
sending, to the core network node, a first REGISTRATION REQUEST message;
start a timer; and
send, to the core network node, a second REGISTRATION REQUEST message based on expiry of the timers.

18. The UE according to claim 17, wherein
the REGISTRATION REQUEST message indicating that the UE is not configured with operator-defined access category definition.

19. A method for core network node, the method comprising:
sending, to a User Equipment (UE), a REGISTRATION ACCEPT message containing at least one operator-defined access category definition to cause the UE to send a REGISTRATION COMPLETE message indicating acknowledgement of reception of the at least one operator-defined access category definition; and
receiving, from the UE, the REGISTRATION COMPLETE message wherein the at least one operator-defined access category definition includes OS id+OS App id.

20. A method for a User Equipment (UE) the method comprising:
receiving, from a core network node, a REGISTRATION ACCEPT message including at least one first operator-defined access category definition;
storing the at least one first operator-defined access category definition; and
sending, to the core network node, a REGISTRATION COMPLETE message indicating acknowledgement of the at least one first operator-defined access category definition in a case where the REGISTRATION ACCEPT MESSAGE includes the at least one first operator-defined access category definition, wherein the at least one first operator-defined access category definition includes OS id+OS App id.

21. A core network node comprising:
a memory having stored therein program instructions; and
at least one processor that when executing the program instructions is configured to:
send, to a User Equipment (UE), a REGISTRATION ACCEPT message containing at least one operator-defined access category definition to cause the UE to send a REGISTRATION COMPLETE message indicating acknowledgement of reception of the at least one operator-defined access category definition; and receive, from the UE, the REGISTRATION COMPLETE message wherein the at least one operator-defined access category definition includes OS id+OS App id.

22. A User Equipment (UE) comprising:

a memory having stored therein program instructions; and at least one processor that when executing the program instruction is configured to:

receive, from a core network node, a REGISTRATION ACCEPT message including at least one first operator-defined access category definition;

store the at least one first operator-defined access category definition; and send, to the core network node, a REGISTRATION COMPLETE message indicating acknowledgement of the at least one first operator-defined access category definition in a case where the REGISTRATION ACCEPT MESSAGE includes the at least one first operator-defined access category definition, wherein the at least one first operator-defined access category definition includes OS id+OS App id.

* * * * *